United States Patent
Froitzheim et al.

(10) Patent No.: US 9,805,531 B2
(45) Date of Patent: Oct. 31, 2017

(54) ACCESS ARRANGEMENT FOR A VEHICLE

(71) Applicant: Continental Automotive GmbH, Hannover (DE)

(72) Inventors: Herbert Froitzheim, Pettendorf (DE); Alexander Kramer, Regenstauf (DE)

(73) Assignee: CONTINENTAL AUTOMOTIVE GMBH, Hanover (DE)

(*) Notice: Subject to any disclaimer, the term of this patent is extended or adjusted under 35 U.S.C. 154(b) by 0 days.

(21) Appl. No.: 14/429,965

(22) PCT Filed: Sep. 3, 2013

(86) PCT No.: PCT/EP2013/068205
§ 371 (c)(1),
(2) Date: Mar. 20, 2015

(87) PCT Pub. No.: WO2014/044524
PCT Pub. Date: Mar. 27, 2014

(65) Prior Publication Data
US 2015/0248801 A1    Sep. 3, 2015

(30) Foreign Application Priority Data
Sep. 20, 2012 (DE) .......... 10 2012 216 839

(51) Int. Cl.
*G07C 9/00* (2006.01)
*B60R 25/24* (2013.01)
*B60R 25/40* (2013.01)

(52) U.S. Cl.
CPC ........ *G07C 9/00309* (2013.01); *B60R 25/245* (2013.01); *B60R 25/406* (2013.01);
(Continued)

(58) Field of Classification Search
USPC .......................................... 340/5.6, 5.7, 991
See application file for complete search history.

(56) References Cited

U.S. PATENT DOCUMENTS

| | | | | |
|---|---|---|---|---|
| 5,623,257 A | * | 4/1997 | Bachhuber | G07C 9/00182 340/5.28 |
| 7,696,859 B2 | | 4/2010 | Teshima et al. | 340/5.72 |

(Continued)

FOREIGN PATENT DOCUMENTS

| | | | | |
|---|---|---|---|---|
| CN | 101289908 A | 10/2008 | | B60R 25/01 |
| CN | 102542644 A | 7/2012 | | B60R 25/04 |

(Continued)

OTHER PUBLICATIONS

International Search Report and Written Opinion, Application No. PCT/EP2013/068205, 9 pages, dated Dec. 9, 2013.
(Continued)

*Primary Examiner* — Leon-Viet Nguyen
(74) *Attorney, Agent, or Firm* — Slayden Grubert Beard PLLC (57) ABSTRACT

An access arrangement for a vehicle includes a vehicle-side transceiver for transmitting query signals in a chronologically successive manner in first specified time intervals. The access arrangement also includes at least one mobile identification transmitter including an identification transmitter-side transceiver with an adjustable reception sensitivity for receiving the query signals of the vehicle-side transceiver. Furthermore, the access arrangement includes a monitoring device for outputting a control command in order to reduce the sensitivity of the identification transmitter-side transceiver by a first specified amount if the identification transmitter-side transceiver has received a specified number of query signals transmitted by the vehicle-side transceiver. By reducing the reception sensitivity, a stationary identification transmitter in the vicinity of the vehicle for example remains operational but no longer reacts to query signals of the vehicle-side transceiver, whereby power can be saved.

20 Claims, 2 Drawing Sheets

(52) U.S. Cl.
CPC ...... *G07C 9/00126* (2013.01); *G07C 9/00111* (2013.01); *G07C 2009/00396* (2013.01); *G07C 2009/00769* (2013.01)

(56) References Cited

U.S. PATENT DOCUMENTS

| | | |
|---|---|---|
| 8,237,544 B2 | 8/2012 | Nakashima .................. 340/5.72 |
| 8,907,762 B2 | 12/2014 | Kawamura .................. 340/5.61 |
| 2005/0024181 A1 | 2/2005 | Hofbeck et al. ................ 340/5.7 |
| 2005/0237220 A1 | 10/2005 | Nolan et al. ................ 340/12.34 |
| 2007/0024416 A1 | 2/2007 | Tang et al. .................... 340/5.61 |
| 2007/0057765 A1 | 3/2007 | Ogino et al. ................. 340/5.61 |
| 2008/0258870 A1 | 10/2008 | Sugiura ........................ 340/7.23 |
| 2012/0092129 A1* | 4/2012 | Lickfelt .................. B60R 25/24 340/5.72 |

FOREIGN PATENT DOCUMENTS

| | | | | |
|---|---|---|---|---|
| DE | 10334625 A1 | 3/2005 | ............. B60R 25/02 |
| DE | 102006053615 B4 | 4/2009 | ................ B60J 5/00 |
| DE | 102006035651 B4 | 10/2009 | ............. B60R 25/10 |
| EP | 1501193 A1 | 1/2005 | ........... H03K 17/945 |
| EP | 1638063 A2 * | 3/2006 | ............. G08C 17/00 |
| EP | 1638063 A2 | 3/2006 | ............. B60R 25/00 |
| EP | 2251837 A2 | 11/2010 | ................ G07C 9/00 |
| WO | 2014/044524 A1 | 3/2014 | ............. B60R 25/24 |

OTHER PUBLICATIONS

Chinese Office Action, Application No. 201380060756.9, 14 pages, dated Jun. 2, 2016.

\* cited by examiner

ACCESS ARRANGEMENT FOR A VEHICLE

CROSS-REFERENCE TO RELATED APPLICATIONS

This application is a U.S. National Stage Application of International Application No. PCT/EP2013068205 filed Sep. 3, 2013, which designates the United States of America, and claims priority to DE Application No. 10 2012 216 839.7 filed Sep. 20, 2012, the contents of which are hereby incorporated by reference in their entirety.

TECHNICAL FIELD

The present invention relates to an access arrangement for a vehicle, particularly a motor vehicle, and to a method for operating such an access arrangement for a vehicle. The invention also comprises a vehicle having the access arrangement just mentioned.

BACKGROUND

In order to prevent an unauthorized access to a vehicle, particularly a motor vehicle, modern access authorization systems or access arrangements in vehicles use electronic security systems in which a data communication between a first communication device of the vehicle with a second communication device in a mobile identification transmitter of a user such as a key or a key fob takes place for authenticating a user. When the access arrangement is active, the mobile identification transmitter sends control signals and an identification code, for example, by pressing a certain key by the user of the mobile identification transmitter, to the vehicle whereupon the latter is unlocked or locked, respectively, when the identification code is correct.

In the case of a so-called passive access arrangement, a first communication device of the vehicle first sends out query signals of a particular field strength at regular time intervals in order to check whether a mobile identification transmitter is located within an approach or acquisition region around the vehicle. If a mobile identification transmitter approaches the vehicle and is ultimately able to receive its query signals, it will respond to the reception of a query signal with a corresponding response signal in order to initiate an authentication process or preauthentication process. During this process, data are exchanged in which, in the end, the mobile identification transmitter conveys its authentication code to the vehicle. If the check of the authentication code is successful, it is then possible that a user who is located directly at the vehicle achieves unlocking of the corresponding vehicle door or of all vehicle doors by operating a door handle. Since in this case no active operating of a mechanical or electrical identification transmitter or key needs to be carried out by a user, this type of access authorization is also called passive access authorization check and the corresponding access authorization systems are called passive electronic access authorization systems.

However, in the case of such a passive access arrangement just described, the following problematic situation may occur. A user or driver parks his vehicle in the garage and leaves the vehicle. He then hangs his jacket, in which he has unintentionally kept his key, in the garage in the vicinity of his vehicle on a hook and leaves the garage. As has already been mentioned above, the vehicle continues to send out query signals at regular time intervals which are received by the key in the jacket since it is within the acquisition region or approach region of the vehicle. In other words, the key is woken by each query signal of the vehicle, generates a response signal and sends it back to the vehicle. Although this is not associated with any desire of a driver to perform an authentication in order to be able to enter the vehicle, the regular waking by a query signal and sending out a corresponding response signal consumes current unnecessarily in the key which reduces the service life of the key or of the identification transmitter, respectively. Furthermore, current is also consumed unnecessarily in the vehicle by the receiving and processing of the corresponding response signals.

SUMMARY

One embodiment provides an access arrangement for a vehicle, having the following features: a vehicle-mounted transmitting/receiving device for sending out query signals successively in time in first predetermined time intervals; at least one mobile identification transmitter comprising: a transmitting/receiving device at the identification transmitter, having an adjustable reception sensitivity: for receiving the query signals of the vehicle-mounted transmitting/receiving device, a checking device for outputting a control command in order to reduce the sensitivity of the transmitting/receiving device at the identification transmitter by a first predetermined amount when the transmitting/receiving device at the identification transmitter has received a predetermined number of query signals sent out by the vehicle-mounted transmitting/receiving device.

In a further embodiment, the checking device outputs, on reception of a further query signal by the transmitting/receiving device at the identification transmitter, with reduced reception sensitivity, a second control command in order to reduce the reception sensitivity of the transmitting/receiving device at the identification transmitter further by a second predetermined amount.

In a further embodiment, the access arrangement also has a timer for measuring predetermined time intervals.

In a further embodiment, the timer, after completion of a second predetermined time interval, causes the checking device to output a third control command in order to increase the reception sensitivity of the transmitting/receiving device at the identification transmitter again by a third predetermined amount when the transmitting/receiving device at the identification transmitter has not received a query signal after completion of the second predetermined time interval.

In a further embodiment, the checking device, before completion of a second predetermined time interval, outputs the second control command on reception of a further query signal by the transmitting/receiving device at the identification transmitter.

In a further embodiment, the timer begins the measurement of a predetermined second time interval after the transmitting/receiving device at the identification transmitter has received a query signal or after a preceding predetermined second time interval has elapsed without the transmitting/receiving device at the identification transmitter having received a query signal.

In a further embodiment, the transmitting/receiving device at the identification transmitter is configured for sending out a response signal in response to the reception of one or more query signals.

In a further embodiment, the timer is designed to measure, after the reception of a predetermined number of query signals, a third predetermined time interval, and the transmitting/receiving device at the identification transmitter is designed to send out a response signal in response to the reception of the last one of the predetermined number of query signals and then to send out no further response signal until the completion of the third predetermined time interval.

In a further embodiment, the checking device, after setting the sensitivity of the transmitting/receiving device at the identification transmitter to a predetermined value, does not change the sensitivity any further until the transmitting/receiving device at the identification transmitter has received, and answered correspondingly with a response signal, a predetermined number of query signals.

In a further embodiment, the reception sensitivity of the transmitting/receiving device at the identification transmitter can only be adjusted up to a minimum value.

In a further embodiment, the mobile identification transmitter has a control device at the identification transmitter for driving the transmitting/receiving device at the identification transmitter, in which control device the checking device is integrated.

In a further embodiment, the mobile identification transmitter has a storage device at the identification transmitter for storing the evaluated field strength of a query signal received by the transmitting/receiving device at the identification transmitter and/or of the reception sensitivity set on reception of the query signal.

In a further embodiment, the query signals sent out by the vehicle-mounted transmitting/receiving device have identical and/or constant field strength values.

Another embodiment provides a vehicle comprising an access arrangement as disclosed above.

Another embodiment provides a method for operating an access arrangement for a vehicle, comprising the following steps: sending out a number of query signals by the vehicle in first predetermined time intervals; receiving the query signals by at least one mobile identification transmitter; and outputting a control command in order to reduce the reception sensitivity of the mobile identification transmitter by a first predetermined amount when the transmitting/receiving device at the identification transmitter has received a predetermined number of query signals sent out by the vehicle-mounted transmitting/receiving device.

BRIEF DESCRIPTION OF THE DRAWINGS

Example embodiments of the present invention are explained in greater detail below with reference to the attached drawings, in which.

DETAILED DESCRIPTION

Embodiments of the invention provide reliable operation of an access arrangement with minimized current consumption.

One embodiment provides an access arrangement or an identification arrangement, respectively, for a vehicle by means of which, in particular, the access to the vehicle can be controlled comprises the following features. It has a vehicle-mounted transmitting/receiving device for sending out query signals successively in time in first predetermined time intervals. In addition, the access arrangement has at least one mobile identification transmitter or, respectively, a portable user identification device comprising a transmitting/receiving device at the identification transmitter, having an adjustable reception sensitivity for receiving the query signals of the vehicle-mounted transmitting/receiving device. In addition, the access arrangement has a checking device for outputting a control command in order to reduce the sensitivity of the transmitting/receiving device at the identification transmitter by a first predetermined amount when the transmitting/receiving device at the identification transmitter has received a predetermined number of query signals sent out by the vehicle-mounted transmitting/receiving device. Reducing the sensitivity of the transmitting/receiving device at the identification transmitter has the result that it no longer reacts to query signals of the vehicle-mounted transmitting/receiving device, i.e. no longer processes any query signals or sends out a corresponding response signal. In this manner, it is thus possible to save power in the mobile identification transmitter and also in the vehicle if the mobile identification transmitter is located in an acquisition region of the vehicle or of the vehicle-mounted transmitting/receiving device, but is there in a static state, i.e. does not move with respect to the vehicle.

According to one embodiment of the access arrangement, the checking device is configured in such a way to output, on (proper) reception of a further query signal by the transmitting/receiving device at the identification transmitter, with (now) reduced reception sensitivity, a second control command in order to reduce the reception sensitivity of the transmitting/receiving device at the identification transmitter further by a second predetermined amount. This means that, if the mobile identification transmitter is already in a process of reducing its reception sensitivity, it is possible, according to this embodiment, to reduce the reception sensitivity of the transmitting/receiving device at the identification transmitter rapidly further by only a single (further) acquisition of a query signal. In this way, the reception sensitivity is lowered rapidly in order to pass by this means rapidly into a "power saving mode". To achieve an initially rapid reduction of the reception sensitivity and thus initially pass rapidly into a "power saving mode", it is conceivable to set the first predetermined amount for reducing the reception sensitivity to be greater than the second predetermined amount. However, it is also possible to set the two amounts for reducing the reception sensitivity to be equally large, or to set the second predetermined amount to be greater than the first one.

In order to determine whether a reception is proper, it is possible that, together with a query signal from the vehicle, a pattern is sent which the mobile identification transmitter can recognize when the field strength of the query signal at the location of the mobile identification transmitter exceeds a predetermined acquisition threshold. In other words, if the mobile identification transmitter is in an approach region or acquisition region of the vehicle, a query signal of the vehicle-mounted transmitting/receiving device can be recognized as including the sent pattern by the mobile identification transmitter.

According to a further embodiment of the access arrangement, it has a timer which is configured to measure predetermined time intervals. In particular, the timer is configured for measuring a second predetermined time interval as will be described in the text which follows. The advantage of using such a timer is based on the fact that, since the transmitting/receiving device at the identification transmitter has reduced its reception sensitivity in such a manner at a particular time, according to the above representation, that it can no longer receive a query signal from the vehicle. In other words, due to the reduction of the reception sensitivity to a predetermined low level, a mobile identification transmitter is no longer able to determine whether it is still in the same position or whether it has moved, for example, still further away from the vehicle. It is only able to determine that it is moving towards the vehicle, namely when it suddenly receives query signals again from the vehicle since these then have a greater field strength also at the location of the mobile identification transmitter due to a greater vicinity to the vehicle. However, in order to provide the mobile identification transmitter with the capability of determining where it is located or whether it is still in a static state, respectively, the timer is provided according to this embodiment. In particular, the timer can be arranged in the mobile identification transmitter.

In this arrangement, the measurement of a second time interval can be begun, on the one hand, after a (proper) reception of a query signal or, on the other hand, after a (preceding) second time interval has elapsed. If a query signal is received by the transmitting/receiving device at the identification transmitter before a second time interval has elapsed, the timer advantageously begins the measurement again. In other words, the mobile identification transmitter or its transmitting/receiving device at the identification transmitter is caused, either by the reception of a query signal from the vehicle or by a (time) signal from the timer, to wake up or to execute a predetermined command, respectively.

According to one embodiment of the access arrangement, it can then be provided that the timer, after completion of the second predetermined time interval, causes the checking device to output a third control command in order to increase the reception sensitivity of the transmitting/receiving device at the identification transmitter again by a third amount when the transmitting/receiving device at the identification transmitter has not received a query signal after completion of the second predetermined time interval. This means that, if the reception sensitivity of the transmitting/receiving device at the identification transmitter has been reduced in the preceding sequence by such an amount that no reception of query signals from the vehicle was possible any longer, the timer will cause the checking device to increase the reception sensitivity of the transmitting/receiving device at the identification transmitter again at least by a third predetermined amount. In this context, the third predetermined amount can be equal to the first or to the second predetermined amount (in the reduction of the reception sensitivity), or can be greater than the first or second predetermined amount so that a greater reception sensitivity is set again rapidly, as a result of which moving away of the mobile identification transmitter from the vehicle is also detected more rapidly. If the transmitting/receiving device at the identification transmitter is then able again to receive a query signal from the vehicle, it can conclude that it is still in the vicinity of the vehicle and particularly in a static state (at the same location as during the last reception of a query signal from the vehicle), and can then reduce the reception sensitivity again as mentioned above. By means of the automatic dynamic setting of the reception sensitivity (by continuously reducing or increasing the reception sensitivity, respectively), it is lastly possible to obtain a value of the reception sensitivity which approximately represents the distance of the mobile identification transmitter from the vehicle, the power consumption in the mobile identification transmitter (and lastly also in the vehicle) being reduced by the automatic resetting of the reception sensitivity.

In particular, if the amount of a second time interval is selected to be greater than or, respectively, greater by a multiple than the amount of a first time interval, it is possible to provide that, in a static state of the mobile identification transmitter, a multiplicity of query signals from the vehicle do not need to be received, processed or answered (due to the insensitivity of the transmitting/receiving device at the identification transmitter). It is thus possible to save power or energy in the mobile identification transmitter but also in the vehicle. However, it should be pointed out that a mobile identification transmitter always remains operable in spite of the reduction of the reception sensitivity since it is still able to receive query signals from the vehicle, and react to same, with a higher or increased field strength as occur in an approach to the vehicle-mounted transmitting/receiving device. It is only at a location in the acquisition region or approach region around the vehicle, at which it rests (because it has been forgotten, for example), that it will be brought into a power saving mode according to the above explanation.

Whilst the checking device generally outputs the second control command on reception of a further query signal by the transmitting/receiving device at the identification transmitter, according to the above embodiment, the checking device can also be connected to the timer in such a manner that it outputs the second control command before completion of a second predetermined time interval, on reception of a further query signal.

According to a further embodiment of the access arrangement, the transmitting/receiving device at the identification transmitter is configured for sending out a response signal in response to the reception of one or more query signals. In this context, a number of information items, for example, can be transmitted back to the vehicle with the response signal. For example, field strength values of corresponding query signals, measured at the location of the mobile identification transmitter, the currently set reception sensitivity of the transmitting/receiving device at the identification transmitter and/or an authentication code of the mobile identification transmitter can be transmitted to the vehicle. On the basis of this information, a vehicle-mounted control device is then able to decide whether it outputs a particular control command. For example, if an authorized mobile identification transmitter (which has transmitted a correct authentication code) is located in a particular vicinity from the vehicle, the vehicle-mounted control device can output a signal to a light source such as a flasher in order to output a greeting signal to the driver who carries the mobile identification transmitter. The distance of the mobile identification transmitter from the vehicle can be determined either by means of the field strength values of query signals, measured and transmitted back to a vehicle, at the location of the mobile identification transmitter or by means of the reception sensitivity, set on reception of the query signals, of the transmitting/receiving device at the identification transmitter.

On the basis of the case that a mobile identification transmitter approaches an associated vehicle from a greater distance, for example, the mobile identification transmitter, at a particular distance from the vehicle, will enter into its reception area in which it can receive query signals from the vehicle. Assuming that such a reception area has a radius of approx. 5 to 10 m around the vehicle, an approach up to the vehicle will take several seconds, as a rule. In order to still save power at the mobile identification transmitter with such an approach, the timer is designed, according to one embodiment of the access arrangement, to measure, after the reception of a predetermined number of query signals (for example on entering the acquisition region), a third predetermined time interval, and the transmitting/receiving device at the identification transmitter is designed to send out a response signal in response to the reception of the last one of the predetermined number of query signals and then to send out no further response signal until completion of the third predetermined time interval. In particular, it is when a third predetermined time interval is selected to be very much greater than a first predetermined time interval that the transmitting/receiving device at the identification transmitter will not send out a response signal for a relatively long time and thus save power.

According to a further embodiment of the access arrangement, the checking device, after setting the reception sensitivity of the transmitting/receiving device at the identification transmitter to a predetermined value, does not change the reception sensitivity any further until the transmitting/receiving device at the identification transmitter has received, and answered correspondingly with a response signal, a predetermined number of query signals. Such an embodiment of the access arrangement is helpful, in particular, if particular zones within the acquisition region are to be defined. For example, a zone located remotely from the vehicle within the acquisition region and a zone located more closely to the vehicle can be defined, namely in that the mobile identification transmitter analyses the reception sensitivity of the transmitting/receiving device at the identification transmitter correspondingly. Since this, after corresponding (multiple) setting by the checking device, approximately corresponds to the distance of the mobile identification transmitter from the vehicle, it is possible to recognize the change-over to another zone due to the setting of the reception sensitivity, in which context it is then ensured that a predetermined number of query signals are to be received and correspondingly a response signal is also to be sent back to the vehicle so that the latter, or its control device, respectively, can execute an adequate control command. For example, the checking device, after setting of the sensitivity of the transmitting/receiving device at the identification transmitter to or below a predetermined value, can be configured in such a manner that it does not lower the sensitivity any further until the transmitting/receiving device at the identification transmitter has received a predetermined number of query signals and answered them correspondingly with a response signal. This case may occur if the mobile identification transmitter is moving from a zone more remote from the vehicle into a zone closer to the vehicle, the predetermined value of the sensitivity virtually representing the zone boundary.

According to a further embodiment, the reception sensitivity of the transmitting/receiving device at the identification transmitter should only be adjustable up to a minimum value. This minimum value then corresponds to a reception sensitivity which is necessary in order to still be able to receive query signals of the vehicle at a location immediately at the vehicle, e.g. up to 0.5 m remote from the vehicle. This is intended to ensure that, in every case, an authorization process of the mobile identification transmitter with respect to the vehicle is possible, with a positive completion of which, for example, a vehicle door is unlocked or opened.

According to a further embodiment of the access arrangement, the intelligence of evaluation and control is provided in the mobile identification transmitter. In this regard, the mobile identification transmitter can have a control device at the identification transmitter for driving the transmitting/receiving device at the identification transmitter, in which control device the checking device is integrated. Furthermore, the mobile identification transmitter can have a storage device at the identification transmitter for storing any evaluated field strength values of received query signals and/or of reception sensitivities set in each case on reception of query signals. In this manner, it is possible to compare the field strengths of two query signals (possibly also corrected by the respective reception sensitivity) of two query signals which have been received at different times by the mobile identification transmitter.

In order to be able to perform a simple comparison with respect to the field strength of two query signals, the vehicle-mounted transmitting/receiving device is configured advantageously to send out query signals having identical and/or constant transmit field strength values.

According to a further aspect of the invention, a vehicle comprising an access arrangement according to the above representation or to an embodiment thereof is created.

According to a further aspect of the invention, a method for operating an access arrangement for a vehicle, especially in accordance with the above representation or an embodiment thereof, is created. In this context, the method comprises the following steps. A number of query signals are sent out by the vehicle in (regular) first predetermined time intervals. These query signals are received by at least one mobile identification transmitter. If necessary, a corresponding response signal can be sent out in response to the reception of one or more query signals. Finally, a control command is output in order to reduce the reception sensitivity of the mobile identification transmitter by a predetermined amount when the transmitting/receiving device at the identification transmitter has received a predetermined number of query signals sent out by the vehicle-mounted transmitting/receiving device. In this manner, the method creates the possibility for a mobile identification transmitter which is in a static state, for example because it has been forgotten at a particular location in the vicinity of the vehicle, to reduce its reception sensitivity in such a manner and not having to receive or to evaluate or answer any further query signals at least for a particular time. In this manner, power can be saved particularly at the mobile identification transmitter but also at the vehicle.

As far as they are transferable to the vehicle or to the method, advantageous embodiments of the access arrangement can also be applied as advantageous embodiments of the vehicle or the method, and conversely.

Figure 1:
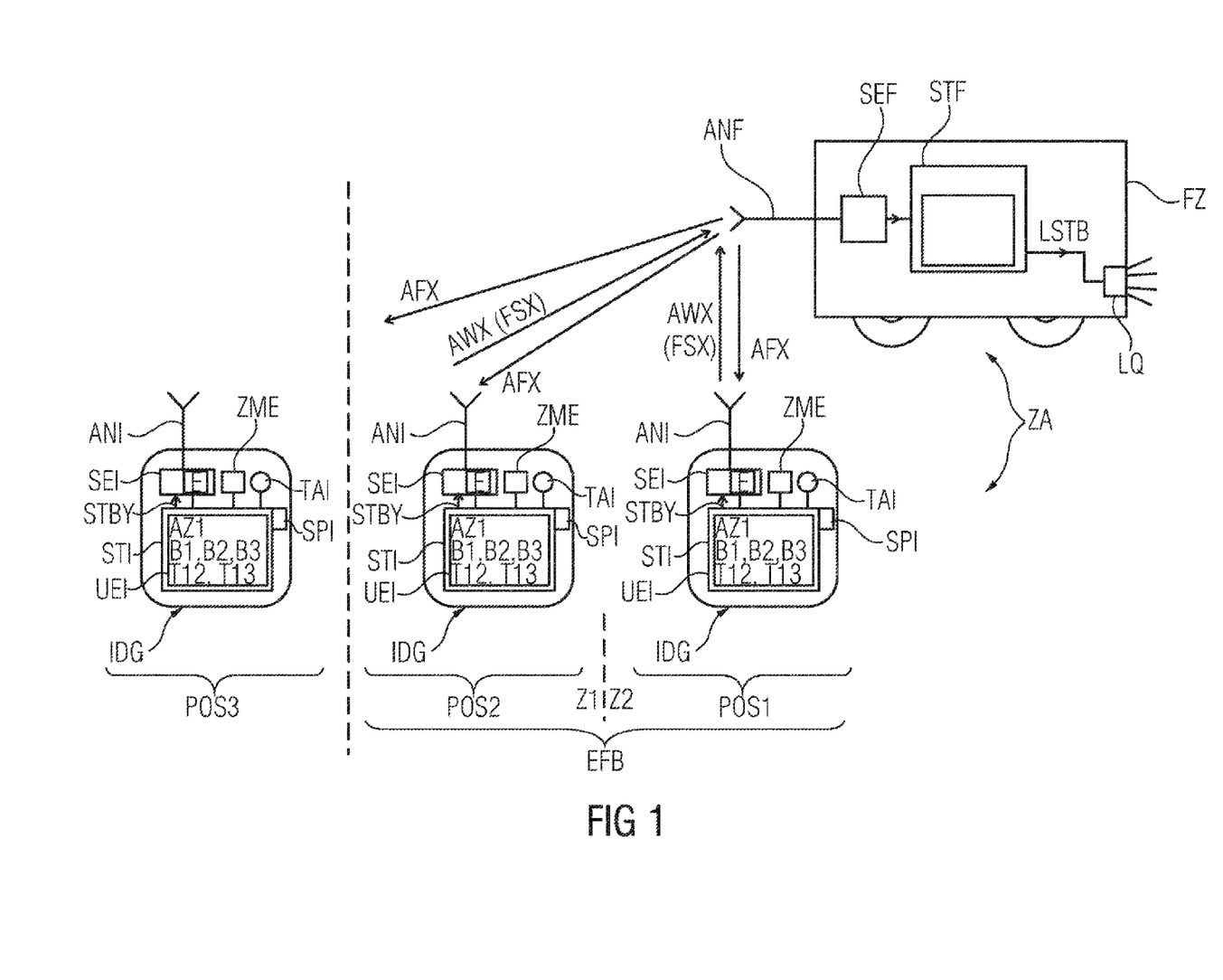
FIG. 1 shows a schematic representation of a passive electronic access authorization system or, respectively, of an access arrangement according to one embodiment of the invention.

Firstly, reference is made to FIG. 1 in which a passive access arrangement ZA for a vehicle FZ which, in particular, is designed as a motor vehicle is shown. As a central component of the vehicle-mounted part of the access arrangement, a vehicle-mounted transmitting/receiving device SEF is provided which is designed for sending out successively in time request signals AFX regularly in first predetermined time intervals TI1 (compare FIG. 2) via a vehicle-mounted antenna ANF. In this arrangement, the query signals AFX are sent out by the antenna ANF with identical or constant transmit field strength.

If a mobile identification transmitter IDG is located within an acquisition region EFB around the vehicle FZ, it can properly receive the query signals AFX. In particular, the query signals AFX can have a code or a predetermined pattern which is recognized by an identification transmitter IDG within the acquisition region EFB. Such a pattern is no longer recognized by an identification transmitter IDG at a position POS3 (on the left in the figure) so that proper reception is no longer possible at this position.

To illustrate the flow chart for setting a reception sensitivity in a mobile identification transmitter IDG, the identification transmitter IDG (as mobile part of the access arrangement ZA) is shown in FIG. 1 at three different positions POS1, POS2 (both within the acquisition range EFB) and POS3. In this arrangement, the identification transmitter IDG comprises a transmitting/receiving device SEI at the identification transmitter, by means of which device it can receive query signals AFX from the vehicle via an antenna ANI at the identification transmitter and by means of which device it can send out corresponding response signals AWX via the antenna ANI, in turn. In addition, the transmitting/receiving device SEI at the identification transmitter can be configured for evaluating the field strength FSX of a received query signal AWX from the vehicle at the location of the mobile identification transmitter IDG, for example as part of an RSSI (Received Signal Strength Indication) measurement. Furthermore, the mobile identification transmitter IDG has a control device STI at the identification side for driving the transmitting/receiving device SEI at the identification transmitter, in which transmitting/receiving device a checking device UEI is provided. The checking device is then configured for outputting a control command in order to set a reception sensitivity E of the transmitting/receiving device SEI at the identification transmitter.

As will be explained in the following FIG. 2, this setting is based on the acquisition of a particular number of query signals at particular times. For the purpose of setting the reception sensitivity E, control commands STBY are transmitted by the control device STI or the checking device UEI, respectively, to the transmitting/receiving device SEI at the identification transmitter. The dummy "Y" in the reference STBY is intended to illustrate that a multiplicity of various control commands can be sent by the control device STI to the transmitting/receiving device SEI for setting the reception sensitivity E.

Figure 2:
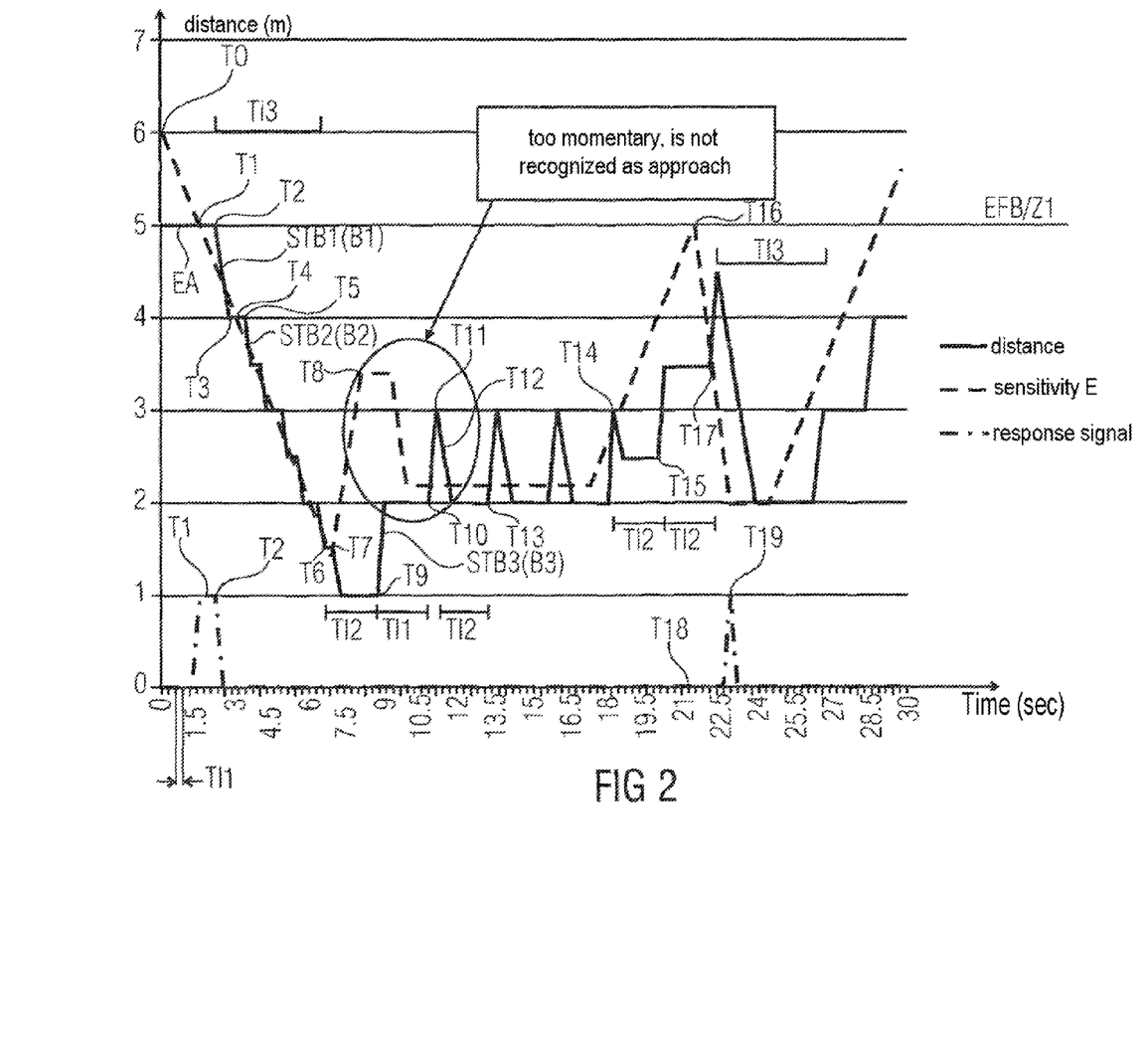
FIG. 2 shows a flow chart for setting the reception sensitivity of a mobile identification transmitter which enters into an acquisition region of the vehicle and moves out of it again.

The mobile identification transmitter IDG also comprises a timer ZME for measuring predetermined time intervals (compare also FIG. 2). Furthermore, the mobile identification transmitter IDG has an operating element in the form of a key TAI which can be operated by a user or driver, respectively. By operating the key TAI, the user can manually set the reception sensitivity of the mobile identification transmitter IDG, for example, back to an initial state (e.g. with high sensitivity).

Furthermore, the mobile identification transmitter IDG has a storage device SPI in which an evaluated field strength of a received query signal and/or the reception sensitivity value set for the reception of the query signal can be stored. By storing an evaluated field strength value of a query signal or the reception sensitivity set on reception of the query signal, a comparison with the evaluated field strength of a further query signal received by the transmitting/receiving device at the identification transmitter can be carried out in order to possibly recognize by the comparison in which direction a mobile identification transmitter is moving (towards the vehicle or away from the vehicle). If the field strength value currently measured is higher than the stored one, it is possible, for example, to conclude that the mobile identification transmitter is approaching the vehicle.

Following the explanation of the essential components of the access arrangement ZA, reference is made to FIG. 2 in which a possible sequence of setting the reception sensitivity E of the transmitting/receiving device SEI at the identification transmitter is shown for the case that the identification transmitter IDG is moving into the vehicle in an acquisition region EFB, is located within the acquisition region for a particular time and is then moving out of the acquisition region again.

The basis for representing the sequence of setting the reception sensitivity E is in FIG. 2 a diagram in which the time is plotted in seconds along the X axis whereas the reception sensitivity E set for the transmitting/receiving device SEI at the identification transmitter or, respectively, the distance of the mobile identification transmitter from the vehicle is plotted along the Y axis.

In the example of FIG. 2 it is also assumed that the vehicle FZ or the vehicle-mounted transmitting/receiving device SEF sends out the query signals AFX regularly at predetermined time intervals TI1 of 300 milliseconds. These query signals are low-frequency or LF signals, the transmit field strength being selected in such a manner that they have here a range of 5 m in the example.

The case is also assumed that the identification transmitter IDG is still outside the acquisition region EFB at time T0, for example at the position POS3 shown in FIG. 1. According to the representation of FIG. 2, the identification transmitter IDG should be located at a distance of 6 m away from the vehicle at time T0. At this time, the reception sensitivity E is set to a starting level EA (with maximum sensitivity) which means that the transmitting/receiving device SEI at the identification transmitter is still capable of properly receiving vehicle-related query signals AFX which are sent out by a vehicle at a distance of 5 m. The higher the reception sensitivity E is set, the greater is the range for signals which can be received by the mobile identification transmitter.

In the time between the time T0 and a time T1, query signals AWX are then sent out by the vehicle but are not received by the mobile identification transmitter IDG due to the distance of the mobile identification transmitter from the vehicle ZF being too great. It is only at time T1, when the mobile identification transmitter IDG enters the acquisition region EFB of the vehicle, that the mobile identification transmitter IDG, which may be located, for example, at position POS2 according to the representation of FIG. 1, is capable of receiving the query signals AFX of the vehicle. In this context, the mobile identification transmitter IDG is designed in such a manner that it receives three query signals AFX from time T1 onwards, processes them and, in each case responding thereto, sends a response signal AWX to the vehicle (compare also the line at the X-axis which identifies the activity of the response signal. Whilst no response signal is sent most of the time—the line of the response signal is then located on the X-axis—a response signal is sent between times T1 and T2 and at time T19, respectively). A respective response signal can contain, for example, an authentication code of the mobile identification transmitter, but it is also conceivable that possibly measured field strengths of the query signals at the location of the mobile identification transmitter are sent in the form of field strength values FSX, possibly with the currently set reception sensitivity E, to the vehicle. Since a predetermined number AZ1 of query signals, namely the three query signals mentioned, had been received on entry into the acquisition region EFB and answered by means of corresponding response signals, the checking device UEI will output a first control command STB1 at time T2 to the transmitting/receiving device SEI at the identification transmitter so that it lowers its reception sensitivity E by a first predetermined amount B1. In the example of FIG. 2, the sensitivity E is reduced in such a manner that the range for query signals to be received from the vehicle is reduced from 5 to 4 meters (i.e. by one meter).

The mobile identification transmitter IDG is thus not able to receive query signals of the vehicle at time T3 since its distance from the vehicle is greater than the set range or sensitivity of the transmitting/receiving device at the identification transmitter.

At time T4, the mobile identification transmitter IDG has then approached the vehicle to within four meters which corresponds to the sensitivity E or range of the transmitting/receiving device SEI at the identification transmitter. In consequence, it is again able to receive query signals AWX of the vehicle. The mobile identification transmitter IDG is then configured in such a manner that the checking device UEI, after having recognized that a further query signal AFX of the vehicle has been detected by the mobile identification transmitter at time T4, outputs a second control command STB2 in order to reduce the reception sensitivity E by a second predetermined amount B2. More precisely, the reception sensitivity is reduced here in such a manner that the range is reduced by half a meter (from 4 to 3.5 meters in the example here) for query signals received by the vehicle.

As is shown in the example of FIG. 2, the mobile identification transmitter moves towards the vehicle in a straight line from time T5 to time T6 so that the distance between the mobile identification transmitter and the vehicle is reduced to 1.5 meters in the example. In accordance with the description, the reception sensitivity is reduced further at times T3 to T5. In this context, the first predetermined amount E1 was selected to be twice as large with one meter than the second predetermined amount of 0.5 m, as in the example. In this manner, a reduction of the reception sensitivity of the power consumption is effected as rapidly as possible on entry into the acquisition region in which much power is consumed in the mobile identification transmitter for receiving, processing and sending out signals.

At time T6, the mobile identification transmitter IDG ends its approach to the vehicle and begins to move away from it again. However, a query signal is still received at time T7 which is why the checking device outputs a second control command STB2 so that the transmitting/receiving device at the identification transmitter reduces its reception sensitivity E by the second predetermined amount B2, namely to a sensitivity or range of one meter. Since the mobile identification transmitter is located, for example at time T8, at a distance of approx. 3.5 m away from the vehicle, the mobile identification transmitter will not be able to receive a query signal from the vehicle with its set sensitivity or range, respectively. In order to be able to not only reduce the reception sensitivity E automatically as has been explained previously, but also to increase it again automatically, the mobile identification transmitter IDG has the timer ZME which is capable of measuring predetermined time intervals. In principle, the timer ZME, on receiving a query signal AFX from the vehicle, will therefore (again) begin to measure a second predetermined time interval TI2, for example of 1.9 seconds (s) (since up to time T7 from the reception of a respective query signal up to the reception of the following query signal, a time interval of 1.9 s has never been attained, the timer ZME has never been able to count through the complete time interval TI2 but has always been interrupted already before and has recommenced counting or measuring).

Since the reception sensitivity has then been reduced at time T7, as mentioned above, to a range of 1 m and the mobile identification transmitter has moved further away from the vehicle, the measurement of the predetermined second time interval, granted by the timer ZME at time T7, will now be performable completely. The mobile identification transmitter is then designed in such a manner that at time T9, after the second predetermined time interval has elapsed, the checking device is caused to output a third control command STB3 in order to increase the reception sensitivity E of the transmitting/receiving device at the identification transmitter again by a third predetermined amount B3. In this context, the third predetermined amount B3 corresponds to an increase in sensitivity by 1 m and is thus twice as large as the second predetermined amount B2. With the increase in reception sensitivity at time T9, the measurement of a further second time interval is simultaneously begun again by the timer ZME.

As can then be seen in FIG. 2, the reception sensitivity is not sufficient even after the increase for receiving a query signal from the vehicle since the mobile identification transmitter IDG is now still too far away from the vehicle. Thus, the further predetermined second time interval TI2 will also elapse at time T10 so that, on the one hand, the timer causes the checking device UEI again to output a third control command in order to increase the reception sensitivity E of the transmitting/receiving device SEI at the identification transmitter by the third predetermined amount. Furthermore, the timer ZME is also caused to measure the second predetermined time interval TI2 again. Since the reception sensitivity E has now been increased by the third predetermined amount B3 at time T11 so that a range of 3 m is obtained whilst the distance from the vehicle is slightly more than 2 m, the transmitting/receiving device SEI at the identification transmitter again receives a query signal AFX from the vehicle. The checking device UEI will thereupon output again a second control command STB2 for lowering the reception sensitivity by a second predetermined amount B2. At time T12 the transmitting/receiving device SEI at the identification transmitter receives a further query signal AFX of the vehicle so that the checking device UEI again outputs a second control command STB2 in order to decrease the reception sensitivity E by the second predetermined amount B2.

Since the reception sensitivity E has dropped back to a value having a range of 2 m, query signals from the vehicle can no longer be received by the mobile identification transmitter IDG. The timer will thus count a complete second time interval TI2 up to time T13. After that, the timer ZME causes the checking device again to output a third control command STB3 in order to raise the reception sensitivity E of the transmitting/receiving device at the identification transmitter by the third predetermined amount B3. Since the mobile identification transmitter IDG does not move within the period of approx. 9.5 seconds to 18 seconds (is in a static state), the reception sensitivity E is set automatically and dynamically between times T10 and T14, it being below the distance of the mobile identification transmitter from the vehicle for most of the time with respect to its range in order not to be able to receive any query signals from the vehicle in this static case of the mobile identification transmitter, and thus to be able to save power.

At time T14, after the sensitivity E has been increased again by a third predetermined amount B3, the mobile identification transmitter receives a query signal from the vehicle whereupon the checking device UEI lowers the reception sensitivity again by a predetermined second amount B2. Since the mobile identification transmitter IDG is then moving away further from the vehicle, the timer ZME increases the reception sensitivity E by a second predetermined amount B2 after a first predetermined second time interval TI2 has elapsed at time T15, and is then increased again by a third predetermined amount B3 after a second predetermined second time interval TI2 has elapsed at time T17.

However, since the mobile identification transmitter has reversed its direction of movement at time T16 and is now moving rapidly in the direction of the vehicle, it is possible that the mobile identification transmitter can receive four successive query signals from the vehicle from time T18 onward. The mobile identification transmitter is then designed in such a manner that, after entering into the "power saving process" at time T2 with the reduction of the reception sensitivity, it only sends out a response signal AWS again when a predetermined number, four successive query signals of the vehicle, in the example, have been received. The mobile identification transmitter or its transmitting/receiving device SEI at the identification transmitter thus sends out at time T19 a response signal which can be received by the vehicle-mounted transmitting/receiving device SEF. The latter now knows that the mobile identification transmitter IDG is moving rapidly in the direction of the vehicle and can take corresponding measures. For example, the vehicle-mounted transmitting/receiving device SEF can forward the response signal of the mobile identification transmitter to a vehicle-mounted control device STF which, in turn, outputs a light control command LSTB to a light source, particularly a flasher or an ambient light source LQ in order to activate this light source for a particular time, for example 10 seconds.

After the response signal has been output, the reception sensitivity E of the transmitting/receiving device at the identification transmitter, as has already been described previously, is set again or reduced, if possible.

According to an advantageous embodiment of the method described with reference to FIG. 2 for setting the reception sensitivity E, it is conceivable that the mobile identification transmitter is also designed in such a manner that, after sending out the last response signal, before a reduction of the reception sensitivity E, it lets the timer ZME count or measure a third predetermined time interval TI3, in which context, the transmitting/receiving device SEI at the identification transmitter must send out no response signal until the completion of this third predetermined time interval TI3 in order to save power. This embodiment is shown in FIG. 2 in such a manner that, at time T2 and at time T19, a corresponding third predetermined time interval begins to run within which no response signal must be sent to the vehicle.

According to a further embodiment, it is conceivable that, as has been shown at time T19, in the reduced-reception-sensitivity E mode, a response signal is sent out by the transmitting/receiving device at the identification transmitter only if it has previously received four query signals AFX from the vehicle (properly). This will be the case especially with a fast approach of a driver with his mobile identification transmitter, lasting over a relatively long time interval, as has taken place between times T18 and T19. In contrast, the approach between times T9 and T10 was rapid but over a too short time to be recognized as such by the vehicle.

According to a further embodiment of the invention, it is also conceivable that the acquisition region EFB of the vehicle is subdivided into two or more zones wherein the mobile identification transmitter, but also the vehicle, show a corresponding reaction on entry into the respective zone. So that the identification transmitter, in spite of its process for saving power, can identify an entry into a particular zone to the vehicle, it is possible that the checking device UEI, after setting a particular sensitivity E in accordance with a particular range or zone within which the mobile identification transmitter must be located in order to receive query signals from the vehicle, does not change the reception sensitivity further until the transmitting/receiving device SEI at the identification transmitter has received a predetermined number of query signals and answered them correspondingly with a response signal. In particular, the checking device UEI, with an approach of the mobile identification transmitter to the vehicle, after setting the reception sensitivity E to or below a predetermined value, cannot lower the sensitivity any further (only increase) until the transmitting/receiving device at the identification transmitter has received a predetermined number of query signals and answered them accordingly with a response signal. This can be provided, for example, on transgression from the zones Z1, shown in FIG. 1, into Z2 of the acquisition region EFB.

What is claimed is:

1. An access arrangement for a vehicle, comprising:
   a vehicle-mounted transmitting/receiving device configured to send out query signals successively in time in first predetermined time intervals; and
   at least one mobile identification transmitter comprising:
   a mobile transmitting/receiving device having an adjustable reception sensitivity for receiving the query signals of the vehicle-mounted transmitting/receiving device; and
   a checking device configured to output a control command that reduces a sensitivity of the mobile transmitting/receiving device by a first predetermined amount in response to the mobile transmitting/receiving device receiving a predetermined number of query signals sent out by the vehicle-mounted transmitting/receiving device; and
   a timer configured to measure first and second predetermined time intervals of respective durations, wherein the duration of the second predetermined time interval is greater than the duration of the first predetermined time interval;
   wherein if the mobile transmitting/receiving device does not receive a query signal during the second predetermined time interval the timer, after completion of the second predetermined time interval, causes the checking device to output a third control command increasing the reception sensitivity of the mobile transmitting/receiving device by a third predetermined amount.

2. The access arrangement of claim 1, wherein the checking device is configured to output, in response to reception of a further query signal by the mobile transmitting/receiving device having reduced reception sensitivity, a second control command that further reduces the reception sensitivity of the mobile transmitting/receiving device by a second predetermined amount.

3. The access arrangement of claim 2, wherein the checking device, before completion of a second predetermined time interval, outputs the second control command in response to reception of a further query signal by the mobile transmitting/receiving device.

4. The access arrangement of claim 1, wherein the timer begins a measurement of a predetermined second time interval after the mobile transmitting/receiving device has received a query signal or after a preceding predetermined second time interval has elapsed without the mobile transmitting/receiving device having received a query signal.

5. The access arrangement of claim 1, wherein the mobile transmitting/receiving device is configured to send out a response signal in response to receiving one or more query signals.

6. The access arrangement of claim 1, wherein:
the timer is configured to measure, after reception of a predetermined number of query signals, a third predetermined time interval, and
the mobile transmitting/receiving device is configured to send out a response signal in response to reception of a last one of the predetermined number of query signals, and then to send out no further response signal until completion of the third predetermined time interval.

7. The access arrangement of claim 1, wherein the checking device, after setting the sensitivity of the mobile transmitting/receiving device to a predetermined value, does not change the sensitivity any further until the mobile transmitting/receiving device has received and responded to a predetermined number of query signals.

8. The access arrangement of claim 1, wherein the reception sensitivity of the mobile transmitting/receiving device is adjustable only up to a minimum value.

9. The access arrangement of claim 1, wherein the mobile identification transmitter includes a control device configured to drive the mobile transmitting/receiving device, wherein the checking device is integrated in the control device.

10. The access arrangement of claim 1, wherein the mobile identification transmitter includes a storage device that stores an evaluated field strength of at least one of (a) a query signal received by the mobile transmitting/receiving and/or (b) a reception sensitivity set on reception of the query signal.

11. The access arrangement of claim 1, wherein the query signals sent out by the vehicle-mounted transmitting/receiving device have field strength values that are at least one of identical and/or constant.

12. A vehicle including an access arrangement comprising:
a vehicle-mounted transmitting/receiving device configured to send out query signals successively in time in first predetermined time intervals;
at least one mobile identification transmitter comprising:
a mobile transmitting/receiving device having an adjustable reception sensitivity for receiving the query signals of the vehicle-mounted transmitting/receiving device; and
a checking device configured to output a control command that reduces a sensitivity of the mobile transmitting/receiving device by a first predetermined amount in response to the mobile transmitting/receiving device receiving a predetermined number of query signals sent out by the vehicle-mounted transmitting/receiving device; and
a timer configured to measure first and second predetermined time intervals of respective durations, wherein the duration of the second predetermined time interval is greater than the duration of the first predetermined time interval;
wherein if the mobile transmitting/receiving device does not receive a query signal during the second predetermined time interval the timer, after completion of the second predetermined time interval, causes the checking device to output a third control command increasing the reception sensitivity of the mobile transmitting/receiving device by a third predetermined amount.

13. A method for operating an access arrangement for a vehicle, the method comprising:
sending out a number of query signals by a vehicle-mounted transmitting/receiving device in first predetermined time intervals measured by a timer;
receiving the query signals by a mobile transmitting/receiving device of a mobile identification transmitter;
outputting a control command that reduces a reception sensitivity of the mobile identification transmitter by a first predetermined amount in response to the mobile transmitting/receiving device receiving a predetermined number of query signals sent out by the vehicle-mounted transmitting/receiving device; and
if the mobile transmitting/receiving device does not receive a query signal during a second predetermined time interval causing the checking device to output a third control command increasing the reception sensitivity of the mobile transmitting/receiving device by a third predetermined amount, wherein the duration of the second predetermined time interval is greater than the duration of the first predetermined time interval.

14. The method of claim 13, further comprising outputting, in response to reception of a further query signal by the mobile transmitting/receiving device having reduced reception sensitivity, a second control command that further reduces the reception sensitivity of the mobile transmitting/receiving device by a second predetermined amount.

15. The method of claim 13, further comprising using a timer to measure predetermined time intervals.

16. The method of claim 15, further comprising, after completion of a second predetermined time interval defined by the time, outputting a third control command that increases the reception sensitivity of the mobile transmitting/receiving device by a third predetermined amount in response to the mobile transmitting/receiving device not receiving a query signal during the second predetermined time interval.

17. The method of claim 14, comprising outputting the second control command before completion of a second predetermined time interval and in response to reception of a further query signal by the mobile transmitting/receiving device.

18. The access arrangement of claim 1, wherein the duration of the second predetermined time interval is an integer multiple of the duration of the first predetermined time interval.

19. The vehicle of claim 12, wherein the duration of the second predetermined time interval is an integer multiple of the duration of the first predetermined time interval.

20. The method of claim 13, wherein the duration of the second predetermined time interval is an integer multiple of the duration of the first predetermined time interval.

* * * * *